(12) United States Patent
Sandur et al.

(10) Patent No.: US 12,271,588 B1
(45) Date of Patent: Apr. 8, 2025

(54) PRIORITIZATION OF MEMORY TRAFFIC FOR MULTI-PROCESS WORKLOADS

(71) Applicant: Advanced Micro Devices, Inc., Santa Clara, CA (US)

(72) Inventors: Atul Kumar Sujayendra Sandur, Santa Clara, CA (US); Sergey Blagodurov, Bellevue, WA (US); Nathaniel Morris, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/192,971

(22) Filed: Mar. 30, 2023

(51) Int. Cl.
*G06F 3/06* (2006.01)

(52) U.S. Cl.
CPC .......... *G06F 3/0604* (2013.01); *G06F 3/0655* (2013.01); *G06F 3/0673* (2013.01)

(58) Field of Classification Search
CPC ..... G06F 3/0604; G06F 3/0655; G06F 3/0673
See application file for complete search history.

(56) References Cited

U.S. PATENT DOCUMENTS

| | | | |
|---|---|---|---|
| 2002/0062427 A1* | 5/2002 | Chauvel | G06F 1/329 |
| | | | 711/138 |
| 2004/0068627 A1* | 4/2004 | Sechrest | G06F 12/121 |
| | | | 711/E12.071 |

* cited by examiner

*Primary Examiner* — Jae U Yu
(74) *Attorney, Agent, or Firm* — Greenberg Traurig, LLP

(57) ABSTRACT

The disclosed device includes a memory-semantic fabric comprising memory components accessible by multiple processors and a controller for the memory-semantic fabric. The controller receives, from multiple processes, memory requests for a memory-semantic fabric. The controller also identifies, within the processes, a source process for each of the memory requests and prioritizes forwarding the memory requests to the memory-semantic fabric based on the source processes. Various other methods, systems, and computer-readable media are also disclosed.

20 Claims, 6 Drawing Sheets

PRIORITIZATION OF MEMORY TRAFFIC FOR MULTI-PROCESS WORKLOADS

BACKGROUND

Various computing advances allow for increased scalability of computing. For example, multi-process workloads such as microservices allow a single application to be implemented as several small services or processes that can interact with each other. Cloud applications have been moving from monolithic applications to microservices due to their increased deployment agility. In addition, fabric-attached memory (FAM) or memory-semantic fabrics provide an interface to access memory across networked devices (e.g., allowing access to memory from remote machines), further allowing resource efficiency for memory-intensive applications. However, microservices within an application can have varying memory usage characteristics.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
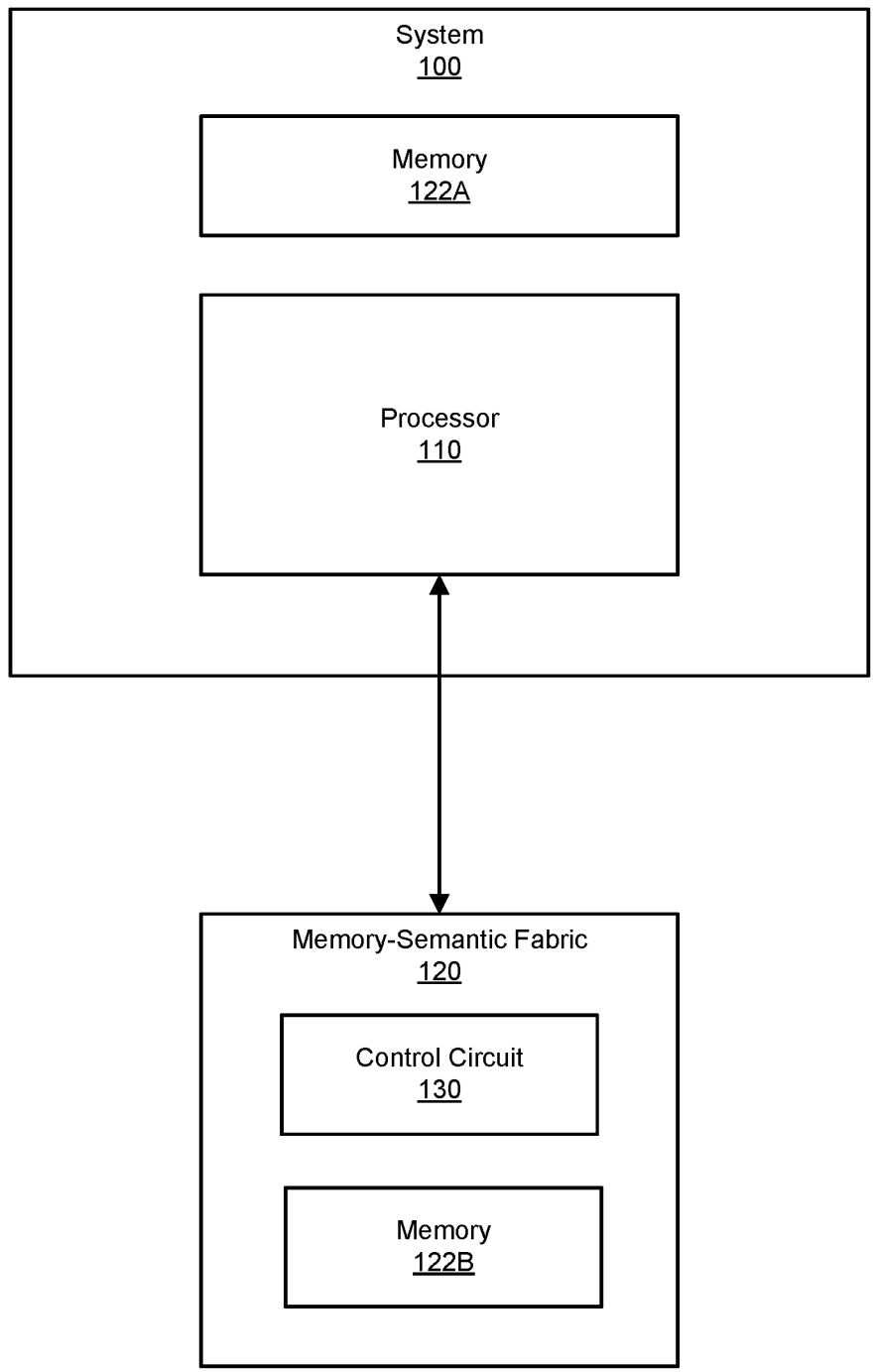
FIG. 1 is a block diagram of an exemplary system for prioritizing memory traffic for multi-process workloads.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to prioritizing of memory traffic for multi-process workloads. As will be explained in greater detail below, implementations of the present disclosure identify memory usage of individual processes and can prioritize memory traffic for memory-intensive processes. Thus, systems and methods described herein allow granular management of memory-semantic fabrics to improve the functioning of a computer. In addition, the systems and methods described herein can improve the fields of cloud computing and microservice-based application platforms as well as other multi-process workloads, such as virtualized workloads or parallel workloads.

As will be described in greater detail below, the instant disclosure describes various systems and methods for receiving memory requests for a memory-semantic fabric, identifying source processes (e.g., microservices or other multi-process workloads) for the memory requests, and prioritizing forwarding the memory requests to the memory-semantic fabric based on the source processes.

In one implementation, a device for prioritizing memory traffic for multi-process workloads includes a memory-semantic fabric having memory components accessible by multiple processors and a controller for the memory-semantic fabric. The controller configured to: (i) receive, from a plurality of processes, a plurality of memory requests for a memory-semantic fabric, (ii) identify, within the plurality of processes, a source process for each of the plurality of memory requests, and (iii) prioritize forwarding the memory requests to the memory-semantic fabric based on source processes.

In some examples, the controller is further configured to determine a memory priority for each identified source process. In some examples, the controller is configured to determine the memory priority for each identified source process by observing a number of memory requests for the memory-semantic fabric by the source process over a time interval and designating, in response to the number of memory requests exceeding a threshold number of requests, the source process as high memory priority.

In some examples, the controller is configured to determine the memory priority for each identified source process by reading, from a configuration, a parameter designating the memory priority for the source process.

In some examples, the controller is configured to determine the memory priority for each identified source process by observing a wait time for the source process waiting on memory requests and designating, in response to the wait time exceeding a threshold wait time, the source process as high memory priority.

In some examples, the controller is configured to identify the source process using a page directory base address associated with the memory request. In some examples, the controller is configured to identify the source process by reading a register value associated with the memory request. In some examples, the controller is configured to update memory priorities associated with source processes.

In some examples, the controller is configured to prioritize forwarding the memory requests by allocating cycles for forwarding the memory requests using a weighted round robin based on memory priorities associated with the source processes. In some examples, the weighted round robin is weighted in proportion to corresponding numbers of requests for source processes. In some examples, the weighted round robin is weighted based on scaling between high and low priorities. In some examples, the weighted round robin is weighted in proportion to corresponding wait times on memory requests for source processes.

In one implementation, a system for prioritizing memory traffic for multi-process workloads includes a plurality of physical processors, a memory-semantic fabric comprising memory components accessible by the plurality of processors, and a controller. The controller is configured to: (i) receive, from a plurality of processes, a plurality of memory requests for the memory-semantic fabric, (ii) identify, within the plurality of processes, a source process for each of the plurality of memory requests, (iii) determine a memory priority for each identified source process, and (iv) prioritize forwarding the memory requests to the memory-semantic fabric by allocating cycles for forwarding the memory requests using a weighted round robin based on the memory priorities of the source processes.

In some examples, the controller is configured to determine the memory priority for each identified source process by observing a number of memory requests for the memory-semantic fabric by the source process over a time interval and designating, in response to the number of memory requests exceeding a threshold number of requests, the source process as high memory priority. In some examples, the controller is configured to determine the memory priority for each identified source process by reading, from a configuration, a parameter designating the memory priority for the source process.

In some examples, the controller is configured to determine the memory priority for each identified source process by observing a wait time for the source process waiting on memory requests, and designating, in response to the wait time exceeding a threshold wait time, the source process as high memory priority. In some examples, the controller is configured to identify the source process by reading, from a register, a page directory base address associated with the memory request.

In one implementation, a method for prioritizing memory traffic for multi-process workloads includes (i) receiving, from a plurality of processes, a plurality of memory requests for a memory-semantic fabric comprising memory components accessible by multiple processors, (ii) identifying, within the plurality of processes, a source process for each of the plurality of memory requests based on a page directory base address associated with the memory request, (iii) determining a memory priority for each identified source process, and (iv) prioritizing forwarding the memory requests to the memory-semantic fabric by allocating more cycles for forwarding the memory requests to source processes with high memory priorities than source processes with low memory priorities.

In some examples, a high memory priority is determined based on at least one of: (a) a number of memory requests for the source process over a time interval exceeding a threshold number of requests, (b) a parameter designating the memory priority for the source process, or (c) a wait time for memory requests for the source process exceeding a threshold wait time.

In some examples, the method further includes allocating the cycles using a weighted round robin that is weighted based on at least one of (a) a proportion of corresponding numbers of requests for source processes, (b) scaling between high and low priorities, or (c) a proportion of corresponding wait times on memory requests for source processes.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-6, detailed descriptions of systems and methods for prioritizing memory traffic of a memory-semantic fabric for multi-process workloads. Detailed descriptions of example systems will be provided in connection with FIG. 1. Detailed descriptions of an example memory-semantic fabric will be provided in connection with FIG. 2. Detailed descriptions of an example microservice-based application will be provided in connection with FIG. 3. Detailed description of an example architecture for prioritizing memory traffic of a memory-semantic fabric for multi-process workloads will be provided in connection with FIG. 4. Detailed descriptions of corresponding computer-implemented methods will also be provided in connection with FIG. 5. In addition, detailed descriptions of an example scheduling will be provided in connection with FIG. 6.

FIG. 1 is a block diagram of an example system 100 for prioritizing memory traffic of a memory-semantic fabric for multi-process workloads. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 122A. Memory 122A generally represents any type or form of volatile or non-volatile storage device or medium capable of storing data and/or computer-readable instructions. Examples of memory 122A include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory-semantic fabric 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, system 100 (e.g., processor 110) is coupled to a memory-semantic fabric 120. A memory-semantic fabric, in some examples, refers to one or more memory devices connected to a fabric as an interface to allow access to various devices (e.g., processors and other components). The fabric allows access to memory devices that can be distributed across various physical interfaces, including networked devices, such that the memory devices can be flexibly allocated as resources. For example, memory-semantic fabric 120 includes a memory 122B that can correspond to a memory device similar to memory 122A. Memory-semantic fabric 120 further includes a control circuit 130 that corresponds to a circuit for managing memory-semantic fabric 120 (e.g., access to memory 122B).

Figure 2:
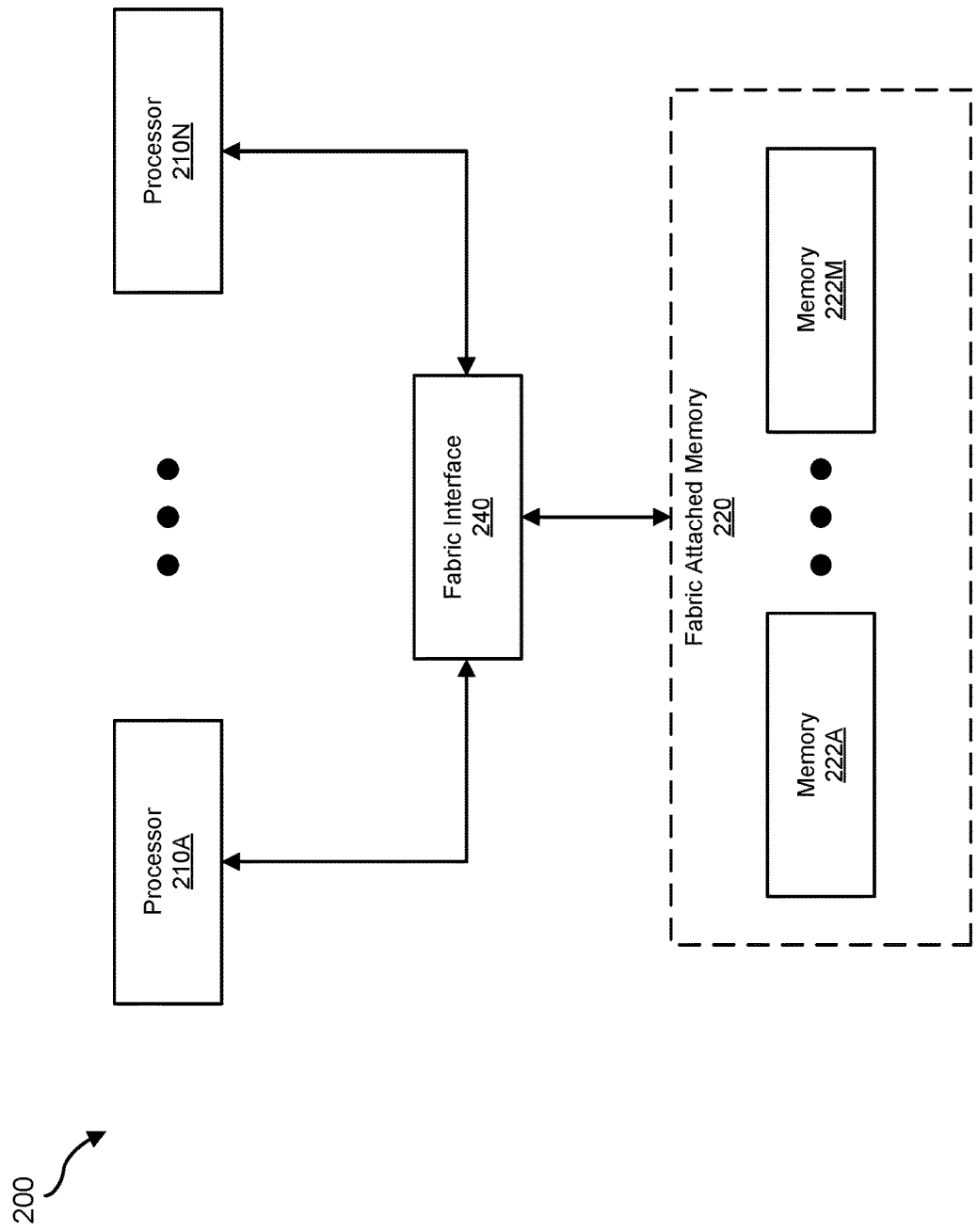
FIG. 2 is a block diagram of an exemplary memory-semantic fabric.

FIG. 2 illustrates a system 200, that corresponds to system 100, having a memory-semantic fabric. System 200 includes multiple processors such as a processor 210A, corresponding to an iteration of processor 110 and a processor 210N corresponding to another iteration of processor 110. System 200 also includes a fabric attached memory (FAM) 220 that corresponds to memory-semantic fabric 120. FAM 220 includes multiple memory devices such as a memory 222A, corresponding to an iteration of memory 122B and a memory 222M corresponding to another iteration of memory 122B. System 200 further includes a fabric interface 240.

As illustrated in FIG. 2, processors 210A-210N can access FAM 220 (e.g., memory 222A-222M) via fabric interface 240. Thus, even if memory 222A-222M are remote from processors 210A-210N (e.g., off socket, in another device, etc.), processors 210A-210N can access memory 222A-222M. FAM 220 can include a control circuit (e.g., control circuit 130) for managing access to memory 222A-222M to prevent a single processor/application from monopolizing a particular memory resource.

Figure 3:
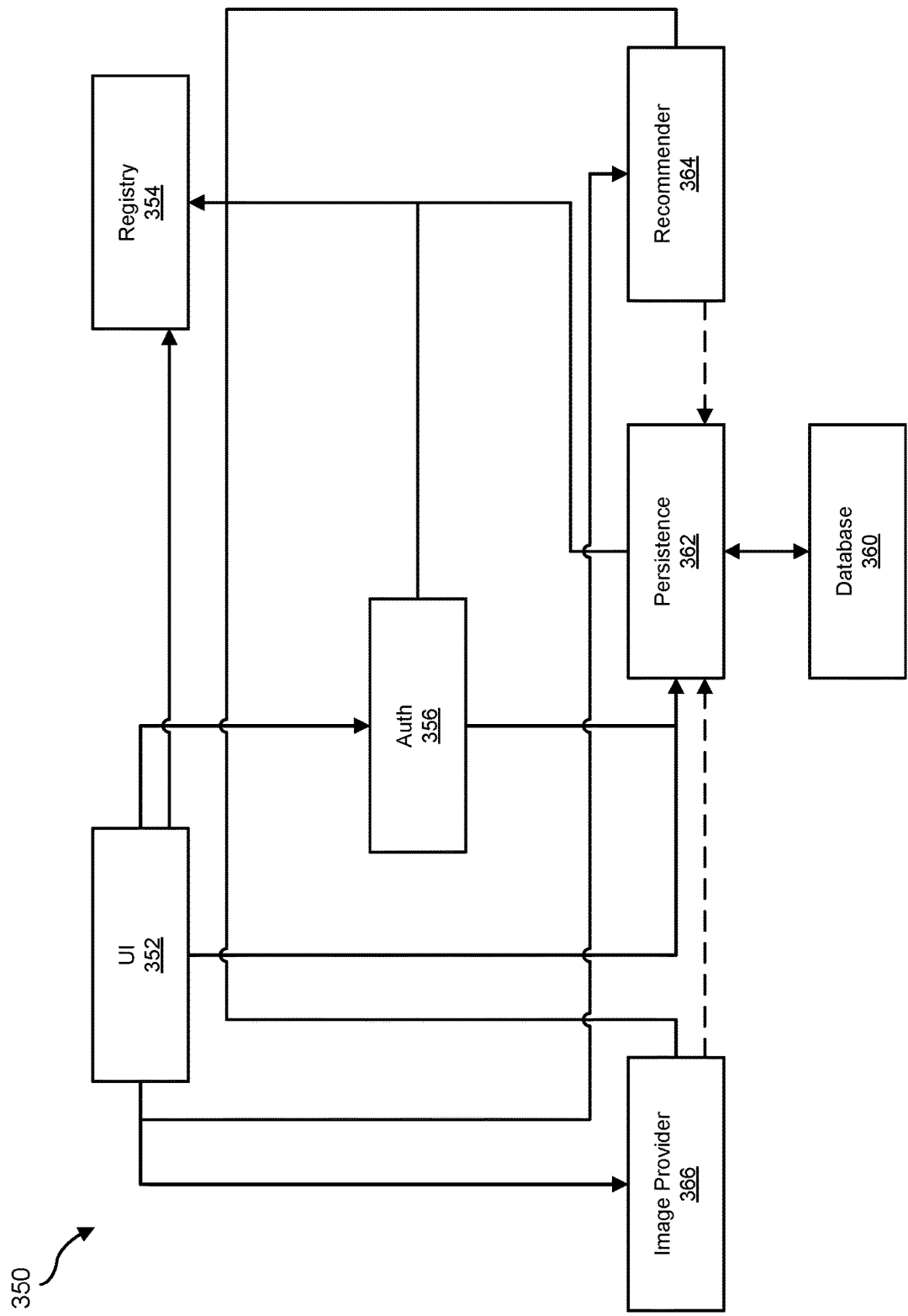
FIG. 3 is a diagram of a microservice-based application.

FIG. 3 illustrates an example microservices-based application 350 implemented with various microservices for various functionalities and/or roles, including a user interface (UI) 352, a registry 354, an authorization (auth) 356, an image provider 366, a persistence 362, a recommender 364, and a database 360. In contrast to a monolithic application, in which a single application performs most or all functions (e.g., in its own process/memory space), microservices-based application 350 includes microservices for specific functions/roles, allowing the microservices to run independently yet interact with other microservices as needed. For example, UI 352 can interact with auth 356 and registry 354 as needed. In addition, the microservices can change interactions based on a phase of the application. For example, image provider 366 and/or recommender 364 can connect to persistence 362 during a startup, but no longer require the connection thereafter (represented by dashed lines). Each of the microservices can also make independent memory requests as needed. However, in contrast to a monolithic application in which memory requests initiate from a single application (which can simplify memory management for the monolithic application), memory requests from microservices-based application 350 can originate from various microservices. The microservices can have different memory usage characteristics, which can further shift over time (e.g., based on various stages of running microservices-based application 350). FIG. 3 illustrates one example of a microservices-based application. In other examples, microservices-based application 350 can include additional/fewer and/or different microservices with different interaction links therebetween. In addition, although FIG. 3 illustrates a microservice-based application, in other examples the processes can correspond to other multi-process workloads, such as virtualized workloads and/or parallel workloads having multiple processes making memory requests.

Figure 4:
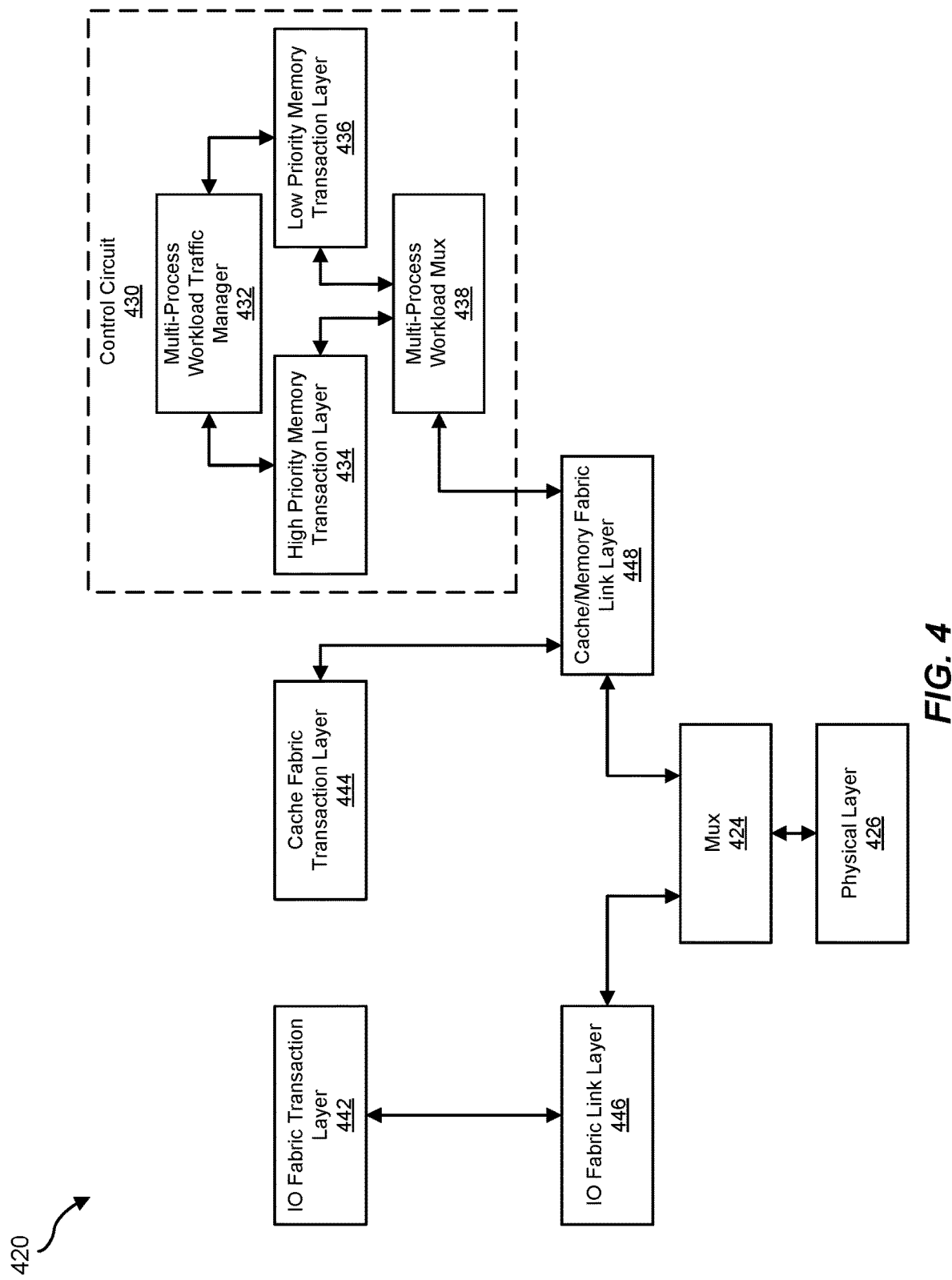
FIG. 4 is a diagram of an exemplary memory-semantic fabric with prioritization.

FIG. 4 illustrates an example memory-semantic fabric 420, which can correspond to memory-semantic fabric 120. In some examples, FIG. 4 can correspond to an architecture for the memory-semantic fabric at a host or system side, so to allow prioritizing memory traffic leaving the host and going into a memory-semantic fabric/network (e.g., memory semantic fabric 420). Memory-semantic fabric 420 can include various layers of components, such as a transaction layer (e.g., an IO fabric transaction layer 442, a cache fabric transaction layer 444, a high priority memory transaction layer 434, and a low priority memory transaction layer 436), a link layer (e.g., an IO fabric link layer 446 and a cache/memory fabric link layer 448), an arbitration/multiplexing layer (e.g., a multiplexer (mux) 424), and a physical layer (e.g., a physical layer 426).

A transaction layer, in some examples, can refer to an uppermost architectural layer that can turn requests and/or data packets into transactions enabling transactions between devices. For instance, the transaction layer is responsible for packet formatting based on transaction type, transaction ordering rules, and crediting to ensure there is no accumulation of transaction requests on the devices/memory nodes. The transaction layer can interact with a corresponding device and a data link layer.

A data link layer, in some examples, can refer to a middle architectural layer that can provide error detection and correction and link management support, for example ensuring data packets are sent in the correct order. The data link layer can interact with a transaction layer and a physical layer.

A physical layer, in some examples, can refer to a lowest architectural layer for sending/receiving data to be sent across the interface. The physical layer can interact with a data link layer and a physical device.

IO fabric transaction layer 442 and IO fabric link layer 446 correspond to an interface (e.g., an IO fabric) for connecting devices to physical layer 426 (e.g., a memory device corresponding to memory 122B). In some implementations, this IO fabric can correspond to an interface for local devices (e.g., components local to physical layer 426) to physical layer 426. Cache fabric transaction layer 444 and cache/memory fabric link layer 448 can correspond to a memory-semantic fabric for connecting local and/or remote devices (e.g., components in a different machine than physical layer 426) to physical layer 426. Mux 424 can multiplex or otherwise arbitrate memory requests between the interface and the memory-semantic fabric. For example, mux 424 can prioritize memory requests from a particular interface, evenly distribute requests, etc. In some implementations, mux 424 can include additional components (e.g., muxes) for further arbitration.

As illustrated in FIG. 4, memory-semantic fabric 420 also includes a control circuit 430 that can correspond to control circuit 130. Control circuit 430 includes a multi-process workload traffic manager 432, high priority memory transaction layer 434, low priority memory transaction layer 436, and a multi-process workload mux 438. Control circuit 430 corresponds to control circuit for the memory-semantic fabric that can provide prioritization of certain memory requests for the memory-semantic fabric. Control circuit 430 will be discussed further with respect to FIG. 5.

Figure 5:
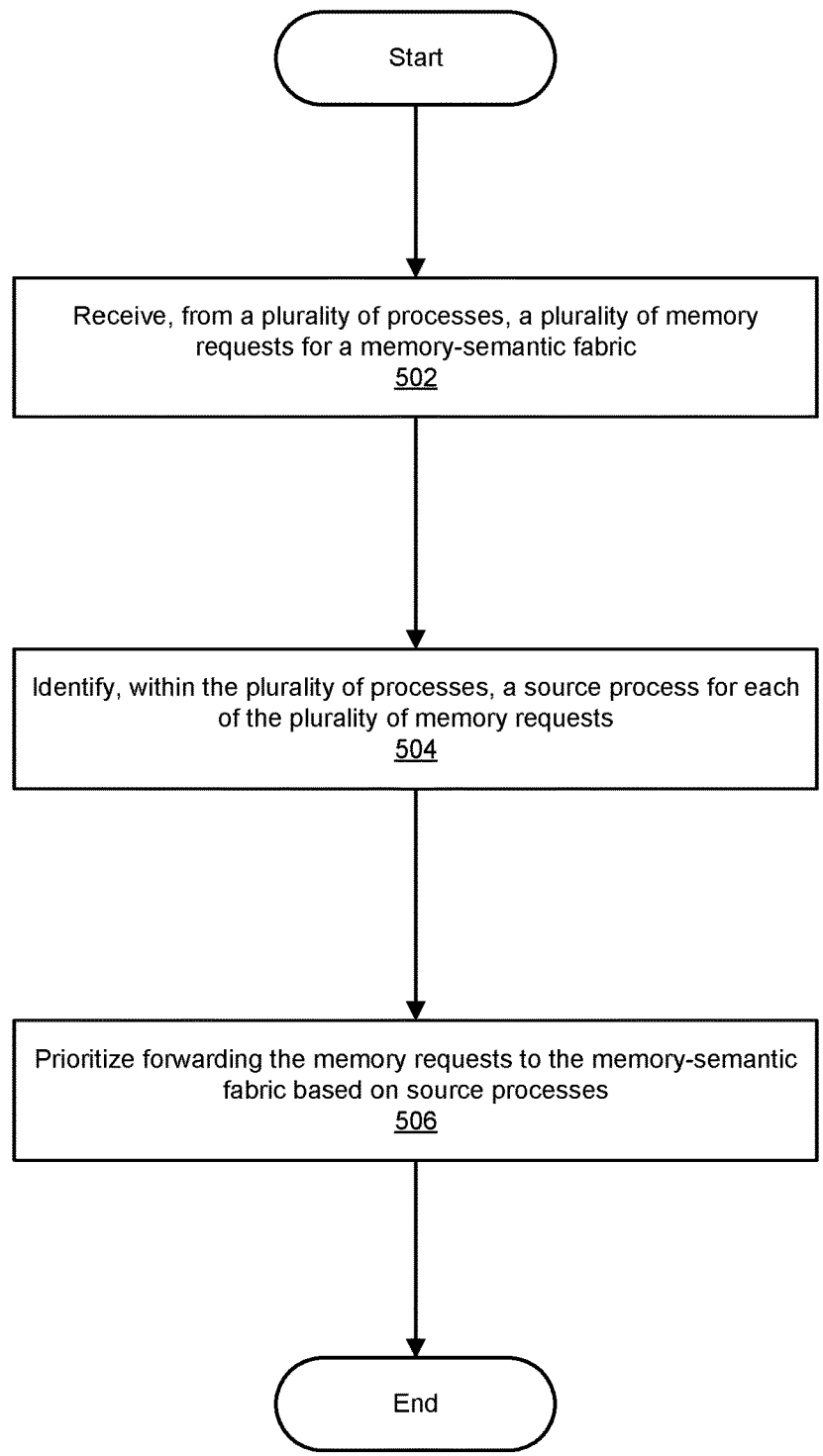
FIG. 5 is a flow diagram of an exemplary method for prioritizing memory traffic for multi-process workloads.

FIG. 5 is a flow diagram of an exemplary computer-implemented method 500 for prioritizing memory traffic for multi-process workloads. The steps shown in FIG. 5 can be performed by any suitable computer-executable code and/or computing system, including the system(s) illustrated in FIGS. 1 and/or 4. In one example, each of the steps shown in FIG. 5 represent an algorithm whose structure includes and/or is represented by multiple sub-steps, examples of which will be provided in greater detail. Although some examples are described herein with respect to microservices, in other implementations the steps shown in FIG. 5 can be applied to other multi-process workloads, such as virtualized workloads, parallel workloads, etc.

As illustrated in FIG. 5, at step 502 one or more of the systems described herein receives, from a plurality of processes, a plurality of memory requests for a memory-semantic fabric. For example, control circuit 430 (e.g., multi-process workload traffic manager 432) receives various memory requests from microservices of a microservice-based application, or alternatively processes of a multi-process workload.

In some implementations, the term "memory request" can refer to one or more commands relating to accessing a memory, such as reading and/or writing data from/to one or more locations. As described herein, the processes or microservices can have specialized functions/roles and can accordingly send memory requests to memory-semantic fabric 420 as needed.

At step 504 one or more of the systems described herein identifies, within the plurality of processes, a source process for each of the plurality of memory requests. For example, control circuit 430 (e.g., multi-process workload traffic manager 432) can identify the source process or microservice for each of the received memory requests.

The systems described herein can perform step 504 in a variety of ways. In one example, multi-process workload traffic manager 432 is configured to identify the source process by reading a register value associated with the memory request. For instance, multi-process workload traffic manager 432 can identify the source process using a page directory base address associated with the memory request and read a corresponding register.

In some implementations, the controller is further configured to determine a memory priority for each identified source process. Multi-process workload traffic manager 432 is configured to determine the memory priority for each identified source process using various schemes and further tag (e.g., by tagging a message header or other metadata) of the memory request with the corresponding priority. Although the examples herein describe a high and a low priority (and control circuit 430 having corresponding high priority memory transaction layer 434 and low priority memory transaction layer 436), in other implementations, additional priority classes can be implemented (including corresponding transaction layers).

In one implementation, multi-process workload traffic manager 432 observes a number of memory requests for the memory-semantic fabric by the source process over a time interval (e.g., a predetermined time and/or number of cycles) and designates, in response to the number of memory requests exceeding a threshold number of requests, the source process as high memory priority. For example, if a particular microservice, such as UI 352, issues a number of memory requests to memory-semantic fabric 420 exceeding the threshold number of requests over the time interval, multi-process workload traffic manager 432 can designate UI 352 as high priority. Multi-process workload traffic manager 432 can designate other identified processes that do not exceed the threshold as low priority. Moreover, although multi-process workload traffic manager 432 can designate between high and low, in other implementations, multi-process workload traffic manager 432 can utilize additional thresholds to determine additional priority classes.

In another example, multi-process workload traffic manager 432 can distinguish between high and low priority based on relative numbers of memory requests. For instance, the threshold number of requests can correspond to a percent of total memory requests over the time interval (e.g., based on percentile). Moreover, in other examples, the threshold number can change as needed (for instance based on available resources, balancing of priority classes, etc.)

In another implementation, multi-process workload traffic manager 432 is configured to determine the memory priority for each identified source process by reading, from a configuration, a parameter designating the memory priority for the source process. For example, multi-process workload traffic manager 432 can read, from a register or a data structure, a priority class associated with each identified microservice or process. In some examples, the parameter can be manually assigned.

In yet another implementation, multi-process workload traffic manager 432 is configured to determine the memory priority for each identified source process by observing a wait time for the source process waiting on memory requests, and designating, in response to the wait time exceeding a threshold wait time, the source process as high memory priority. For instance, multi-process workload traffic manager 432 can observe, via various hardware counters, how long (e.g., cycles, measured time, etc.) each microservice or process has spent waiting on memory requests. A process having waited on memory requests for a time exceeding the threshold wait time can be designated as high priority to reduce the wait time.

In some implementations, multi-process workload traffic manager 432 can utilize a combination of schemes described herein, including partial scheme implementations. In addition, multi-process workload traffic manager 432 can update the memory priorities associated with the source processes, for example by periodically or in response to a trigger reassessing the microservices/processes and/or the priority classes themselves. In some implementations, multi-process workload traffic manager 432 can apply additional policies for prioritization (e.g., based on host node, etc.).

Returning to FIG. 5, at step 506 one or more of the systems described herein prioritizes forwarding the memory requests to the memory-semantic fabric based on source processes. For example, multi-process workload traffic manager 432 can, based on the priority of the associated process or microservice, forward the received memory requests to high priority memory transaction layer 434 or low priority memory transaction layer 436. High priority memory transaction layer 434 and low priority memory transaction layer 436 can forward their respective memory requests to multi-process workload mux 438.

The systems described herein can perform step 506 in a variety of ways. In some implementations, multi-process workload mux 438 can accept memory requests from high priority memory transaction layer 434 and low priority memory transaction layer 436, prioritizing memory requests from high priority memory transaction layer 434 over low priority memory transaction layer 436 as described herein.

In one implementation, multi-process workload mux 438 is configured to prioritize forwarding the memory requests by allocating cycles for forwarding the memory requests using a weighted round robin based on memory priorities associated with the source processes. For example, every cycle, multi-process workload mux 438 can accept a greater number of memory requests from high priority memory transaction layer 434 (as available) than low priority memory transaction layer 436 based on the weighted round-robin scheduling.

Figure 6:
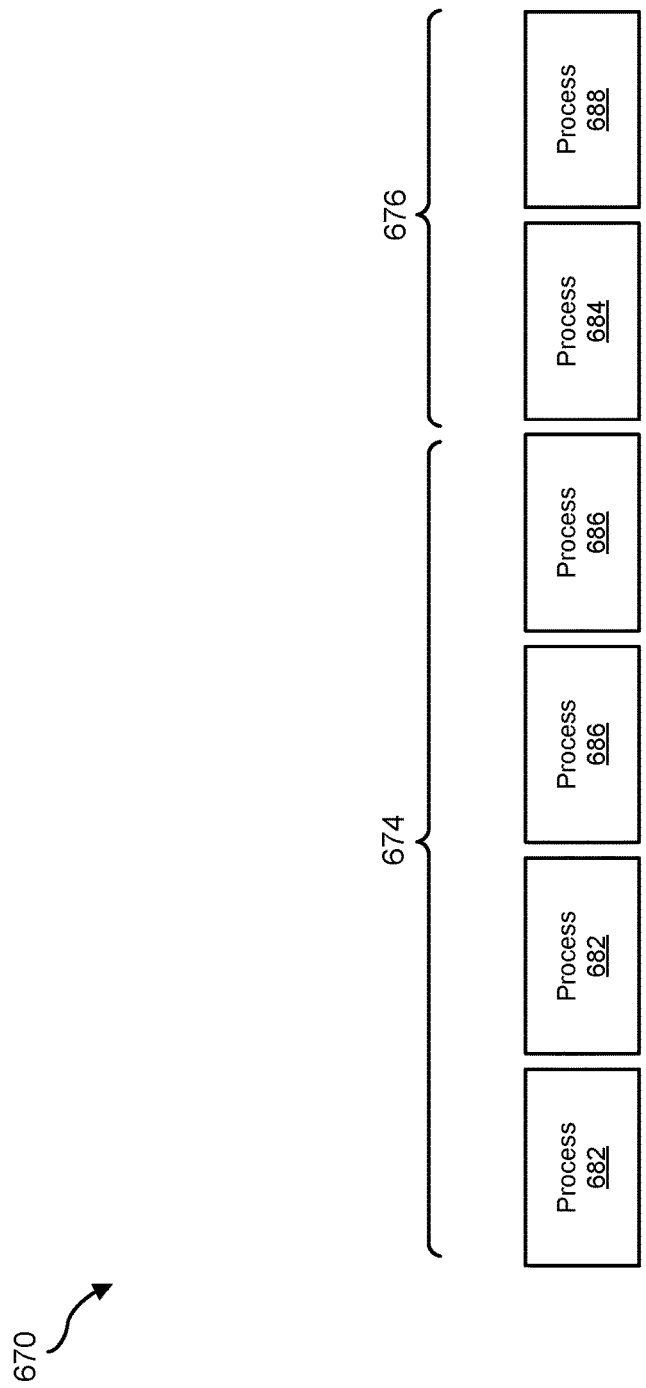
FIG. 6 is a diagram of an exemplary round-robin scheme for prioritizing memory traffic.

FIG. 6 illustrates a diagram 670 of an example weighted round-robin scheduling. FIG. 6 illustrates, for a given cycle, a number of available slots being assigned, for example to a process 682, a process 684, a process 686, and a process 688. In FIG. 6, a subset of slots can be reserved for high priority slots 674 the remaining slots reserved for low priority slots 676. Multi-process workload mux 438 can accept memory requests from high priority memory transaction layer 434 until high priority slots 674 are filled or high priority memory transaction layer 434 is emptied. Similarly, multi-process workload mux 438 can accept memory requests from low priority memory transaction layer 436 until low priority slots 676 are filled or low priority memory transaction layer 436 is emptied. Further, in some implementations, multi-process workload mux 438 can fill empty slots from either transaction layer as needed.

The number of slots for high priority slots 674 and low priority slots 676 can be based on the weighting for the round-robin scheduling. In one implementation, the weighting can be in proportion to corresponding numbers of requests for the source processes. For example, a ratio of high priority slots 674 to low priority slots 676 can be the same or similar to a ratio of memory requests of high priority requests to low priority requests (e.g., as previously observed when classifying processes).

In some implementations, the weighted round robin is weighted based on scaling between high and low priorities. For example, a scaling parameter (e.g., the ratio of high priority slots 674 to low priority slots 676) can be predetermined (e.g., manually selected) based on an architecture of the microservices-based application or multi-process workload.

In some implementations, the weighted round robin is weighted in proportion to corresponding wait times on memory requests for source processes. For example, the ratio of high priority slots 674 to low priority slots 676 can be based on the wait times of one or more high priority processes to that of one or more low priority processes.

In some implementations, multi-process workload mux 438 can utilize one or more of the round-robin schemes described herein. Once multi-process workload mux 438 fills its available slots, multi-process workload mux 438 forwards the memory requests to cache/memory fabric link layer 448, to be further muxed/arbitrated with other memory requests (e.g., by mux 424 as described herein), and accordingly forwarded to physical layer 426 for completing the memory requests.

As detailed herein, the present disclosure is directed to memory traffic prioritization for multi-process workloads, in particular for memory-semantic fabric resources. Composable systems leverage fabric-attached memory (FAM) nodes to scale memory independently of compute resources, enabling the platform to better utilize available memory resources. Microservices enable a single application to be implemented as a suite of small services that can communicate with each other, allowing agility and scalability.

Real-world applications consist of hundreds of microservices which are highly distributed. Depending on the application logic, certain microservices can be memory-intensive and require access to FAM nodes (e.g., though Compute Express Link (CXL) or other interface). However, FAM incurs latency costs which can be significant compared to accessing local DDR memory on the host. By tuning the prioritization of memory accesses at the granularity of individual microservices, depending on their memory usage characteristics the latency cost of accessing remote FAM resources and its performance impact on critical, memory-intensive applications can be reduced.

The systems and methods described herein provide, in one implementation, a pService Traffic Manager that is collocated with Fabric Interface block to monitor fabric memory requests. The actions are performed in response to events observed in the fabric packet stream. Microservices generating memory traffic are grouped under one of the categories High or Low, depending on the degree of memory-sensitivity of the microservice generating the requests. In one implementation, we assume that high rates of fabric traffic generated by a microservice means that the service is memory sensitive. Thus, high memory access latencies observed by such microservices can significantly degrade application performance. To categorize requests based on the type of microservice generating them, the traffic manager intercepts fabric messages, groups them by the ID for the microservice which generated the requests and calculates the observed rate of requests per microservice ID. As a proxy for the microservice ID, Traffic Manager samples the upper 20 bits of a page table register. The register is read once every Nth (e.g., N=100) fabric request, where N is configurable. The rate of fabric requests observed in the previous sampling interval is assumed to be generated by the microservice corresponding to the page table register value that was read. Traffic Manager then analyzes the aggregate rate of fabric requests per-microservice, within a configurable epoch duration (e.g., 1 second). Within the epoch, microservices whose request rates exceed a configurable percentile value (e.g., 75th percentile) are classified as memory sensitive. The request metadata within the message header is tagged with the memory-sensitivity (e.g., memory priority) type High, while the remaining requests are tagged as Low. The traffic manager recalculates the traffic statistics every epoch, which can be configured to 1 second by default. After each epoch, profiling is retriggered for updates, to identify the new memory-sensitive microservices whose information can be propagated to southbound components in the fabric stack.

In another implementation, the workload operator can profile the workload statically and identify sensitive microservices by saving the physical address of the first page directory address for the processes of the sensitive microservices in a special memory mapped register of the Traffic Manager. The Traffic Manager will then check for these values in the upper 20 bits of page table register. If the values match, that means the process corresponding to the sensitive microservice is active, and its memory requests should be prioritized.

Those requests that are from microservices classified as High sensitivity are sent to the high priority fabric transaction layer, while those from Low sensitivity microservices are sent to the low priority fabric transaction layer. The logic to handle the traffic in both the high and low priority transaction layers can, in some examples, be the same. The traffic separation is done before the transaction layer as it enables the multiplexing between two types of traffic in the ARB/MUX layer.

The systems and method provided herein also include a pService Mux. This dynamic multiplexer uses a weighted round-robin policy to assign higher priority to High memory-sensitivity microservices, compared to those with low memory-sensitivity. Additional RW registers are introduced which store the weights for High vs. Low memory-sensitivity microservice traffic. The multiplexer receives the two inputs and assigns more cycles for forwarding the high priority traffic.

In summary, given the source of the fabric traffic (i.e., the microservice ID generating the requests), the pService traffic manager can collect statistics about the requests over time and classify them as belonging to high vs. low priority fabric traffic. After processing by the transaction layer, the pService multiplexer implements the traffic prioritization using a weighted round-robin-based policy for forwarding data to the link layer.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
    a memory-semantic fabric comprising memory components accessible by multiple processors; and
    a controller for the memory-semantic fabric and configured to:
        receive, from a plurality of processes, a plurality of memory requests for a memory-semantic fabric;
        identify, within the plurality of processes, a source process for each of the plurality of memory requests; and
        prioritize forwarding the memory requests to the memory-semantic fabric by allocating cycles for forwarding the memory requests based on memory usage characteristics of the source processes.

2. The device of claim 1, wherein the controller is further configured to determine a memory priority for each identified source process.

3. The device of claim 2, wherein the controller is configured to determine the memory priority for each identified source process by:
    observing a number of memory requests for the memory-semantic fabric by the source process over a time interval; and
    designating, in response to the number of memory requests exceeding a threshold number of requests, the source process as high memory priority.

4. The device of claim 2, wherein the controller is configured to determine the memory priority for each identified source process by reading, from a configuration, a parameter designating the memory priority for the source process.

5. The device of claim 2, wherein the controller is configured to determine the memory priority for each identified source process by:
    observing a wait time for the source process waiting on memory requests; and
    designating, in response to the wait time exceeding a threshold wait time, the source process as high memory priority.

6. The device of claim 1, wherein the controller is configured to identify the source process using a page directory base address associated with the memory request.

7. The device of claim 1, wherein the controller is configured to identify the source process by reading a register value associated with the memory request.

8. The device of claim 1, wherein the controller is configured to prioritize forwarding the memory requests by allocating the cycles for forwarding the memory requests using a weighted round robin based on memory priorities associated with the source processes.

9. The device of claim 8, wherein the weighted round robin is weighted in proportion to corresponding numbers of requests for source processes.

10. The device of claim 8, wherein the weighted round robin is weighted based on scaling between high and low priorities.

11. The device of claim 8, wherein the weighted round robin is weighted in proportion to corresponding wait times on memory requests for source processes.

12. The device of claim 1, wherein the controller is configured to update memory priorities associated with source processes.

13. A system comprising:
a plurality of physical processors;
a memory-semantic fabric comprising memory components accessible by the plurality of physical processors; and
a controller configured to:
  receive, from a plurality of processes, a plurality of memory requests for the memory-semantic fabric;
  identify, within the plurality of processes, a source process for each of the plurality of memory requests;
  determine a memory priority for each identified source process; and
  prioritize forwarding the memory requests to the memory-semantic fabric by allocating cycles for forwarding the memory requests using a weighted round robin based on the memory priorities of the source processes.

14. The system of claim 13, wherein the controller is configured to determine the memory priority for each identified source process by:
  observing a number of memory requests for the memory-semantic fabric by the source process over a time interval; and
  designating, in response to the number of memory requests exceeding a threshold number of requests, the source process as high memory priority.

15. The system of claim 13, wherein the controller is configured to determine the memory priority for each identified source process by reading, from a configuration, a parameter designating the memory priority for the source process.

16. The system of claim 13, wherein the controller is configured to determine the memory priority for each identified source process by:
  observing a wait time for the source process waiting on memory requests; and
  designating, in response to the wait time exceeding a threshold wait time, the source process as high memory priority.

17. The system of claim 13, wherein the controller is configured to identify the source process by reading, from a register, a page directory base address associated with the memory request.

18. A method comprising:
  receiving, from a plurality of processes, a plurality of memory requests for a memory-semantic fabric comprising memory components accessible by multiple processors;
  identifying, within the plurality of processes, a source process for each of the plurality of memory requests based on a page directory base address associated with the memory request;
  determining a memory priority for each identified source process; and
  prioritizing forwarding the memory requests to the memory-semantic fabric by allocating more cycles for forwarding the memory requests to source processes with high memory priorities than source processes with low memory priorities.

19. The method of claim 18, wherein a high memory priority is determined based on at least one of:
  a number of memory requests for the source process over a time interval exceeding a threshold number of requests;
  a parameter designating the memory priority for the source process; or
  a wait time for memory requests for the source process exceeding a threshold wait time.

20. The method of claim 19, further comprising allocating the cycles using a weighted round robin that is weighted based on at least one of:
  a proportion of corresponding numbers of requests for source processes;
  scaling between high and low priorities; or
  a proportion of corresponding wait times on memory requests for source processes.

* * * * *